(12) United States Patent
Breakwell

(10) Patent No.: US 6,561,763 B2
(45) Date of Patent: May 13, 2003

(54) GAS TURBINE ENGINE NOSE CONE

(75) Inventor: Ian S Breakwell, Codnor (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/042,346

(22) Filed: Jan. 11, 2002

(65) Prior Publication Data

US 2002/0102160 A1 Aug. 1, 2002

(30) Foreign Application Priority Data

Jan. 27, 2001 (GB) .............................................. 0102169

(51) Int. Cl.⁷ ................................................. F01D 5/02
(52) U.S. Cl. ..................................... 416/94; 416/245 R
(58) Field of Search ........................ 415/219.1; 416/94, 416/245 R

(56) References Cited

U.S. PATENT DOCUMENTS

| 4,405,285 A | * | 9/1983 | Surdi | ..................... 416/220 R |
|---|---|---|---|---|
| 5,252,160 A | | 10/1993 | Scanlon et al. | |
| 5,833,435 A | * | 11/1998 | Smith | ........................... 416/94 |
| 6,447,255 B1 | * | 9/2002 | Bagnall et al. | ......... 416/245 R |

FOREIGN PATENT DOCUMENTS

| EP | 0 850 831 A | 7/1998 |
| EP | 1 016 588 A | 7/2000 |
| GB | 2 011 542 A | 7/1979 |

* cited by examiner

Primary Examiner—Ninh H. Nguyen
(74) Attorney, Agent, or Firm—W. Warren Taltavull; Manelli, Denison & Selter PLLC

(57) ABSTRACT

A gas turbine engine nose cone (44) comprises a spinner (46) and a fairing (48). The spinner (46) has a conical upstream portion (50) and a cylindrical base portion (52). The fairing (48) is frustoconical and surrounds the base portion (52) of the spinner (46). The outer surface (68) of the fairing (48) forms a continuation of the outer surface (56) of the conical upstream portion (50) of the spinner (46). The outer surface (68) of the fairing (48) has a skin (80) to protect the fairing (48) from erosion and a protective member (86) extends around the upstream end (82) of the fairing (48) to retain the skin (80) on the upstream end (82) of the fairing (48).

9 Claims, 2 Drawing Sheets

GAS TURBINE ENGINE NOSE CONE

BACKGROUND OF THE INVENTION

The present invention relates to a gas turbine engine nose cone, particularly a turbofan gas turbine engine nose cone.

It is known from EP1016588A to provide a gas turbine engine nose cone comprising a spinner having a generally conical upstream portion and a generally cylindrical base portion having a flange removably connected to a fan hub of the gas turbine engine. A frustoconical fairing surrounds the base portion of the spinner and the outer surface of the fairing forms a continuation of the outer surface of the conical upstream portion of the spinner.

It is known from GB2011542A to provide a skin on the outer surface of a gas turbine engine nose cone to protect the nose cone from erosion.

A protective skin has been provided on the outer surface of a fairing of a nose cone comprising a spinner and a fairing, as discussed above. However, the fairing suffers from stripping of the protective skin from the upstream edge of the fairing in operation due to erosion. The protective skin peels off the fairing from the upstream end towards the downstream end in operation of the gas turbine engine due to centrifugal force.

SUMMARY OF THE INVENTION

Accordingly the present invention seeks to provide a novel gas turbine engine nose cone which reduces, preferably overcomes, the above mentioned problems.

Accordingly the present invention provides a gas turbine engine nose cone comprising a spinner having a generally tapering upstream portion and a generally cylindrical base portion, the cylindrical base portion having a flange removably connected to a fan hub of the gas turbine engine, a tapering fairing surrounding the base portion of the spinner, the outer surface of the fairing forms a continuation of the outer surface of the tapering upstream portion of the spinners the outer surface of the fairing having a skin to protect the fairing from erosion and a circumferentially extending protective member extending around the upstream end of the fairing to retain the skin on the upstream end of the fairing.

Preferably the skin comprises polyurethane.

Preferably the circumferentially extending protective member comprises a silicone elastomer.

Preferably a radially inner portion of the circumferentially extending protective member locates in an annular groove on the radially inner surface of the upstream end of the fairing.

Preferably the circumferentially extending protective member is bonded to the upstream end of the fairing.

Preferably the fairing comprises a fibre-reinforced material. Preferably the spinner comprises a fibre-reinforced material. Preferably the fairing comprises a radially inwardly extending lip to form a seal between the upstream end of the fairing and the spinner.

The present invention will be more fully described by way of example with reference to the accompanying drawings in which:

DETAILED DESCRIPTION OF THE INVENTION

Figure 1:
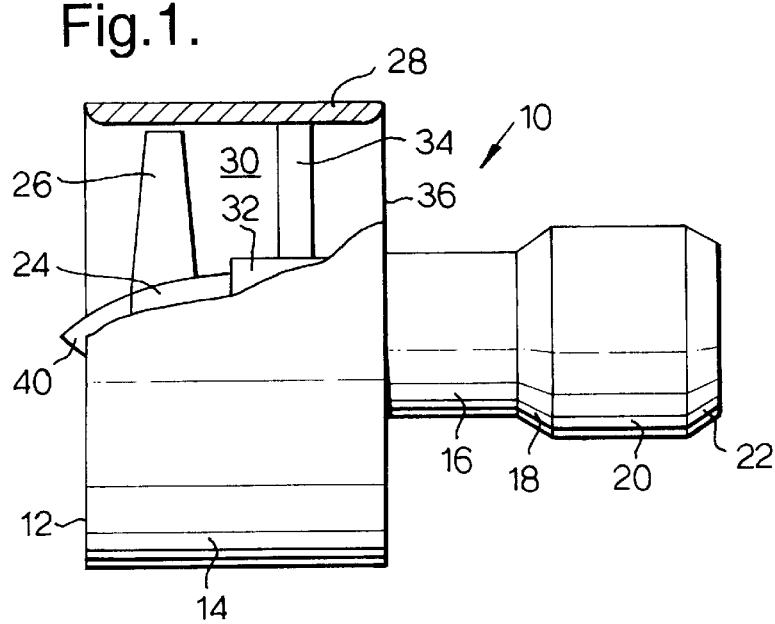
FIG. 1 shows a turbofan gas turbine engine comprising a gas turbine engine nose cone according to the present invention.

A turbofan gas turbine engine 10, as shown in FIG. 1, comprises in axial flow series an inlet 12, a fan section 14, a compressor section 16, a combustion section 18, a turbine section 20 and an exhaust nozzle 22. The turbine section 18 comprises a low pressure turbine (not shown) arranged to drive the fan section 14 via a shaft (not shown). The turbine section 18 also comprises a high pressure turbine (not shown) arranged to drive a high-pressure compressor (not shown) in the compressor section 14 via a shaft (not shown) The turbine section 18 may also comprise an intermediate pressure turbine (not shown) arranged to drive an intermediate pressure compressor (not shown) in the compressor section 14 via a shaft (not shown). The turbofan gas turbine engine 10 operates quite conventionally and its operation will not be discussed further.

The fan section 14 comprises a fan rotor 24 carrying a plurality of circumferentially spaced radially outwardly extending fan blades 26. The fan rotor 24 and fan blades 26 are surrounded by a fan casing 28 which partially defines a fan duct 30. The fan casing 28 is secured to a core casing 32 by a plurality of circumferentially spaced and radially extending fan outlet guide vanes 34. The fan duct 30 has a fan outlet 36 at its downstream end.

Figure 2:
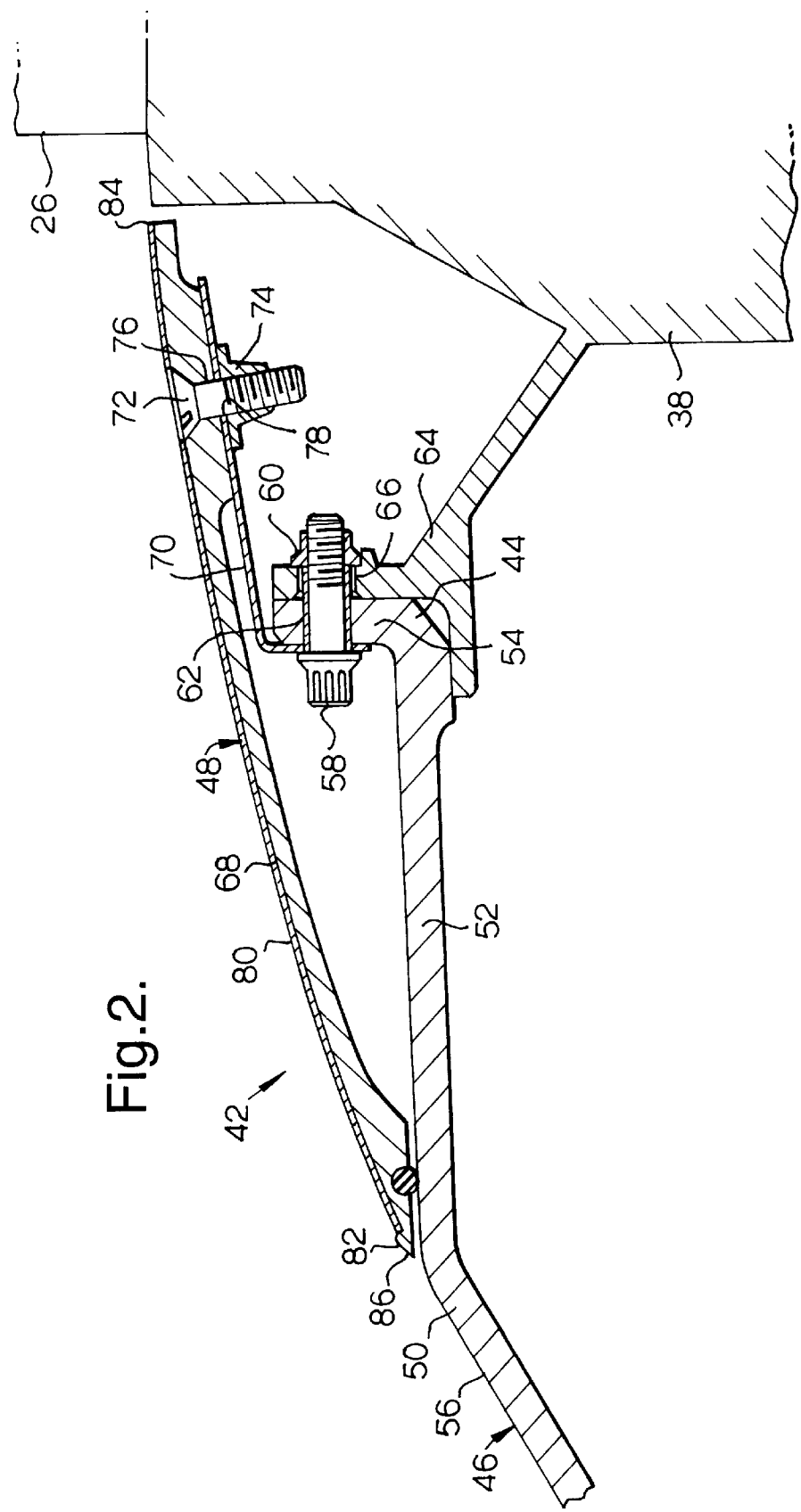
FIG. 2 is an enlarged cross-sectional view of the gas turbine engine nose cone shown in FIG. 1.

The fan rotor 24 comprises a fan disc 38 and a nose cone 40, as shown more clearly in FIG. 2. The fan blades 26 and nose cone 40 are mounted on the fan disc 38. The nose cone 40 is generally of a tapering shape with a point at the upstream end 42 and a circular base portion at the downstream end 44. The nose cone 40 may be either conical, dome shaped or any other suitable shape. The nose cone 40 comprises a spinner 46 and a fairing 48.

The spinner 46 comprises a tapering upstream portion 50 and a generally cylindrical base portion 52. The cylindrical base portion 52 comprises a radially outwardly extending flange 54 which is removably connected to the fan disc 38. The tapering upstream portion 50 is preferably conical, but may be dome shaped or other suitable shapes. The tapering upstream portion 50 of the spinner 46 has an outer surface 56. The cylindrical base portion 52 is connected to the fan disc 38 by fasteners, for example bolts 58 and nuts 60. The bolts 58 extend axially through apertures 62 in the flange 54 and apertures 66 in a radially outwardly extending flange 64 on the fan disc 38. The spinner 46 preferably comprises a fibre-reinforced material, but may comprise titanium or other suitable lightweight material.

The fairing 48 tapers and surrounds the base portion 52 of the spinner 46. The outer surface 68 of the fairing 48 forms a continuation of the outer surface 56 of the tapering upstream portion 50 of the spinner 46. The fairing 48 is preferably frustoconical, but other suitable shapes may be used. The fairing 48 is removably connected to the fan disc 38 by a number of circumferentially spaced L-shaped brackets 70. Each L-shaped bracket 70 is secured to the fairing 38 by fasteners, for example bolts 72 and nuts 74. The bolts 72 extend radially through apertures 76 in the fairing 48 and apertures 78 in the L-shaped brackets 70. The bolts 72 have conical heads and the apertures 76 are countersunk. The fairing 48 preferably comprises a fibre-reinforced material, but may comprise titanium or other suitable lightweight material.

A skin 80 is provided on the outer surface 68 of the fairing 48 to protect the fairing 48 from erosion from particles entering the inlet 12 of the turbofan gas turbine engine 10. Preferably the skin 80 comprises polyurethane, but may comprise other suitable material. The skin 80 extends from the upstream end 82 to the downstream end 84 of the fairing 48.

Figure 3:
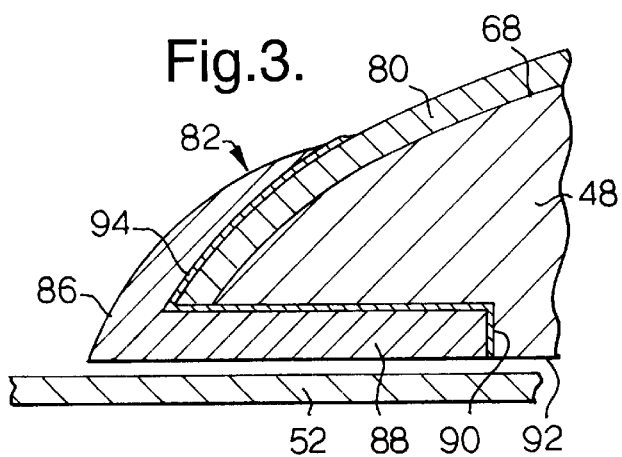
FIG. 3 is a further enlarged cross-sectional view of part of the gas turbine engine nose cone shown in FIG. 2.

A protective member 86 extends around the upstream end 82 of the fairing 48 to retain the skin 80 on the upstream end 82 of the fairing 48, as shown more clearly in FIG. 3. The protective member 86 extends circumferentially through the full extent of the fairing 48. A radially inner portion 88 of the protective member 86 locates in an annular groove 90 on the radially inner surface 92 at the upstream end 82 of the fairing 48. An adhesive 94 is used to bond the protective member 86 into the annular groove 90 at the upstream end 82 of the fairing 48 and to the skin 80. The protective member 86 preferably comprises a silicone elastomer, but other suitable materials, for example other elastomeric materials, metals, alloys or plastics, may be used. The protective member may comprise a fibre reinforced material for example a fibre reinforced silicone elastomer, eg polyester fibre reinforced silicone elastomer. The protective member 86 extends about 4–5 mm along the outer surface 68 of the fairing 48 and over the skin 80. The adhesive 94 comprises silcoset (trade name), or an adhesive 3145 supplied by Dow Corning, but may comprise any other suitable adhesive.

In operation the protective member 86 prevents the particles that enter the inlet 12 of the turbofan gas turbine engine 10 and impact on the leading edge of the fairing 48 lifting the skin 80 away from the leading edge 82 of the fairing 48. This ensures that the centrifugal force on the fairing 48 and skin 80 does not lead to the subsequent peeling of the skin 80 away from the fairing 48. The fairing 48 is protected from erosion for longer periods of time before a new skin 80 has to be provided on the fairing 80.

The spinner 46 may also be provided with a skin to protect against erosion from particles entering the inlet 12 of the gas turbine engine 10.

Figure 4:
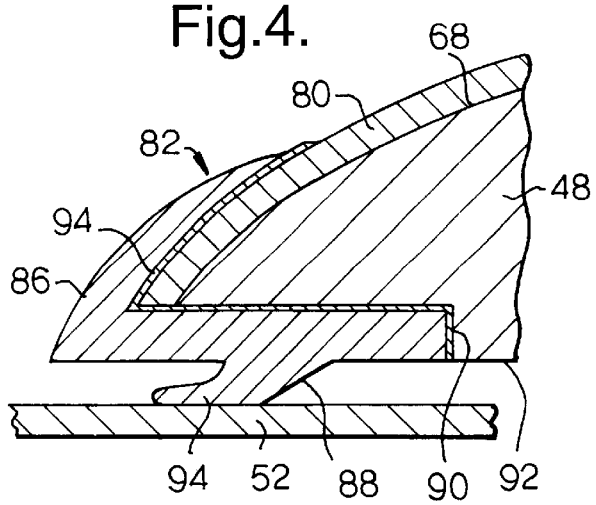
FIG. 4 is an enlarged cross-sectional view of an alternative embodiment of part of the gas turbine engine nose cone shown in FIG. 2.

The embodiment in FIG. 4 is substantially the same as that in FIG. 3 but differs in that the protective member 86 has an integral radially inwardly extending lip 94. The lip 94 reduces, preferably prevents, moisture and dirt entering the space between the fairing 48 and the spinner 46 and may also provide vibration damping of the leading edge of the fairing 48 This may allow the deletion of the separate seal shown in FIG. 2.

I claim:

1. A gas turbine engine nose cone comprising a spinner having a generally tapering upstream portion and a generally cylindrical base portion, the cylindrical base portion having a flange removably connected to a fan hub of the gas turbine engine, a tapering fairing surrounding the base portion of the spinner, the fairing having an outer surface and an upstream end, the spinner having an outer surface, the outer surface of the fairing forms a continuation of the outer surface of the tapering upstream portion of the spinner, the outer surface of the fairing having a skin to protect the fairing from erosion and a circumferentially extending protective member extending around the upstream end of the fairing to retain the skin on the upstream end of the fairing.

2. A gas turbine engine nose cone as claimed in claim 1 wherein the skin comprises polyurethane.

3. A gas turbine engine nose cone as claimed in claim 1 wherein the protective member comprises a silicone elastomer.

4. A gas turbine engine nose cone as claimed in claim 1, wherein the protective member comprises a radially inner portion, the radially inner portion of the upstream end of the fairing having an annular groove on the radially inner surface of the fairing, the protective member locates in the annular groove on the radially inner surface of the upstream end of the fairing.

5. A gas turbine engine nose cone as claimed in claim 4 wherein the protective member is bonded to the upstream end of the fairing.

6. A gas turbine engine nose cone as claimed in claim 1 wherein the fairing comprises a fibre-reinforced material.

7. A gas turbine engine nose cone as claimed in claim 1 wherein the spinner comprises a fibre-reinforced material.

8. A gas turbine engine nose cone as claimed in claim 1 wherein the protective member comprises a radially inwardly extending lip to form a seal between the upstream end of the fairing and the spinner.

9. A gas turbine engine nose cone as claimed in claim 1 wherein the circumferentially extending protective member comprises reinforcing fibres.

* * * * *